United States Patent
Fair et al.

(10) Patent No.: US 8,117,396 B1
(45) Date of Patent: Feb. 14, 2012

(54) MULTI-LEVEL BUFFER CACHE MANAGEMENT THROUGH SOFT-DIVISION OF A UNIFORM BUFFER CACHE

(75) Inventors: Robert L. Fair, Cary, NC (US); Matti A. Vanninen, Cary, NC (US)

(73) Assignee: Network Appliance, Inc., Sunnyvale, CA (US)

( * ) Notice: Subject to any disclaimer, the term of this patent is extended or adjusted under 35 U.S.C. 154(b) by 288 days.

(21) Appl. No.: 11/545,979

(22) Filed: Oct. 10, 2006

(51) Int. Cl.
  *G06F 12/00* (2006.01)
(52) U.S. Cl. ............... 711/133; 711/E12.072; 709/201
(58) Field of Classification Search .................. 711/133, 711/145, E12.072
  See application file for complete search history.

(56) References Cited

U.S. PATENT DOCUMENTS

| | | | |
|---|---|---|---|
| 6,701,393 B1 * | 3/2004 | Kemeny et al. | 710/40 |
| 7,139,859 B2 | 11/2006 | Dastidar et al. | |
| 2002/0056025 A1 * | 5/2002 | Qiu et al. | 711/133 |
| 2003/0088739 A1 * | 5/2003 | Wilkes et al. | 711/133 |
| 2006/0136446 A1 * | 6/2006 | Hughes et al. | 707/101 |
| 2006/0155940 A1 | 7/2006 | Au et al. | |

* cited by examiner

*Primary Examiner* — Reginald Bragdon
*Assistant Examiner* — Victor Wang
(74) *Attorney, Agent, or Firm* — Blakely, Sokoloff Taylor & Zafman LLP

(57) ABSTRACT

Methods and apparatuses provide a multi-level buffer cache having queues corresponding to different priority levels of queuing within the buffer cache. One or more data blocks are buffered in the buffer cache. In one embodiment, an initial level of queue is identified for a data block to be buffered in the buffer cache. The initial level of queue can be modified higher or lower depending on a value of a cache property associated with the data block. In one embodiment, the data block is monitored for data access in a queue, and the data block is aged and moved to higher level(s) of queuing based on rules for the data block. The rules can apply to the queue in which the data block is buffered, to a data type of the data block, or to a logical partition to which the data block belongs.

19 Claims, 8 Drawing Sheets

MULTI-LEVEL BUFFER CACHE MANAGEMENT THROUGH SOFT-DIVISION OF A UNIFORM BUFFER CACHE

FIELD

Embodiments of the invention relate to cache management in a network storage system, and more particularly to providing levels of priority queuing and caching policies with buffers of a cache.

BACKGROUND

A network storage system includes multiple storage devices or disks coupled with a storage server that has interconnecting hardware and control hardware. The storage server stores and retrieves data on behalf of clients of the storage system. The services provided by the storage server involve the exchange of data between clients and the disks. The exchange of data between the clients and the disks often involves buffering data. The buffers may be cached to improve the speed and performance of the storage server. The storage server includes a buffer cache in memory to store the buffers. The buffers are generally blocks of data. The exchange or other access to data within the storage server typically includes access to data of multiple different types.

There have been basically two, traditional approaches to providing a buffer cache within the storage server. One approach is to provide memory that is hard separated (through either physical separation or partitioning) into multiple, separate physical caches. Hard separated caches are unable to share data. Each separate cache can have different rules that apply to data in the cache. With hard-separated caches, different types of data can be handled differently based upon the cache handling the data. However, hard separation of memory into physical caches traditionally requires expensive configuration. Additionally, hard division of memory into separate caches is inflexible as to cache size. Thus, the cost of physical division is typically higher than a uniform cache because enough memory must be allocated to ensure maximum needs for each different type of data is met. Additionally, the reconfiguration of the system can be burdensome if a different data type is introduced or a different set of rules is desired to be applied to a data type.

Another approach to caching buffers is the use of a large uniform buffer cache. A large uniform buffer cache is frequently managed according to a least recently used (LRU) buffer replacement scheme, although other approaches are known (e.g., random, last-in first-out (LIFO), most recently used (MRU), least-frequently-used (LFU), etc.). LRU approaches are traditionally rather indiscriminate as to the relative importance of a particular data type within a system. In general, traditional uniform cache approaches fail to provide adequate controls for different data types of the buffers. Not only does the treatment of different data types traditionally encounter problems with a lack of granular control of buffer replacement, but traditional LRU caches fail to adequately address different user-level objects with different buffer cache policies. The results of the traditional problems of a single LRU cache can be poor cache performance where data that is wanted is removed from a cache while unwanted data may be kept.

SUMMARY

A storage server includes a multi-level buffer cache having queues corresponding to different priority levels of queuing within the buffer cache. The rules and queuing priority are tiered with the queues, and different rules for buffer replacement can be applied separately for each queue. One or more data blocks are buffered in the buffer cache. In one embodiment, an initial queue level is identified for a data block to be buffered in the buffer cache. The initial queue level can be modified higher or lower depending on a value of a cache property associated with the data block. In one embodiment, the data block is monitored for data access in a queue, and the data block is aged and/or moved to higher level(s) of priority based on rules for the data block. The rules can apply to the queue in which the data block is buffered, to a data type of the data block, or to a logical partition to which the data block belongs.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
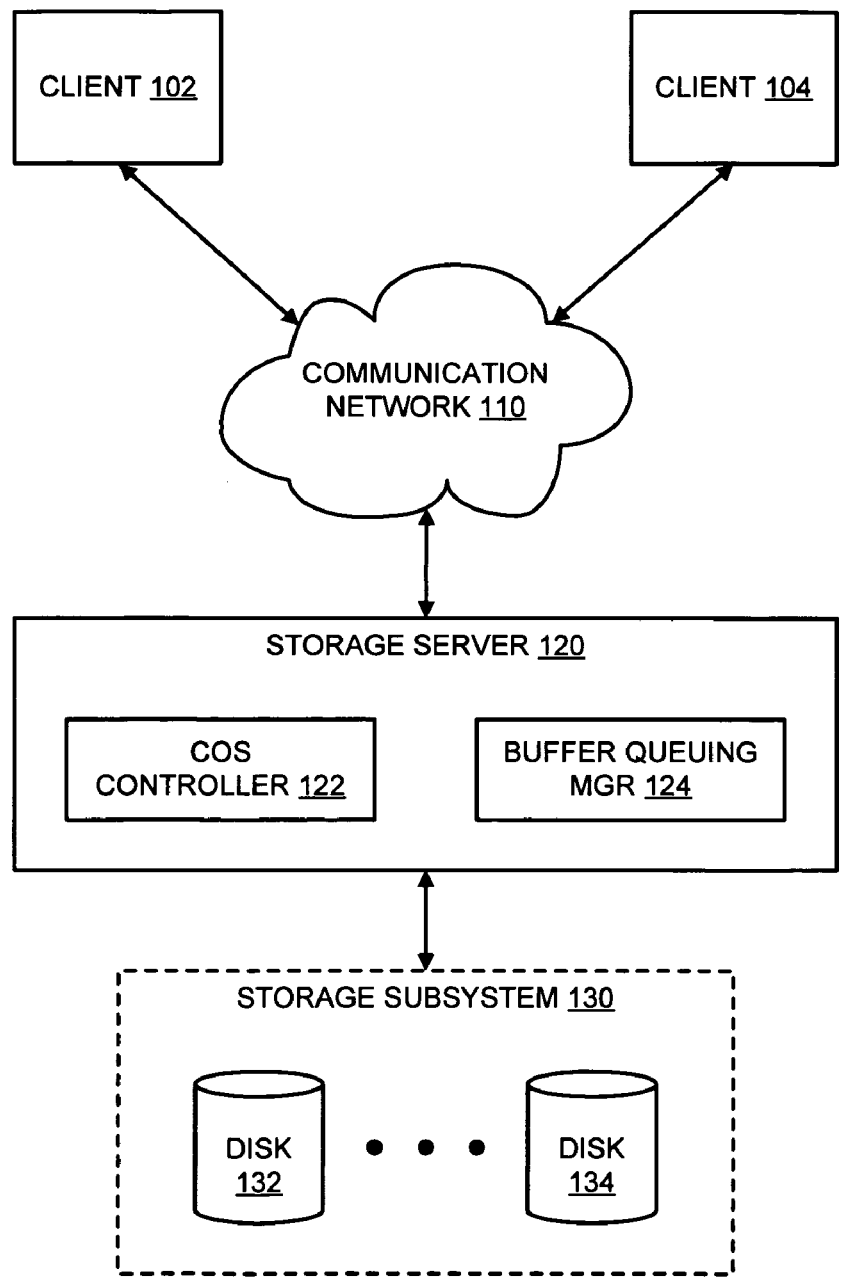
FIG. 1 is a block diagram of an embodiment of a storage server coupled to a storage subsystem, the storage server having a control-of-service controller and a buffer queuing manager.

As used herein, references to one or more "embodiments" are to be understood as describing a particular feature, structure, or characteristic included in at least one implementation of the invention. Phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, with an overview description of embodiments of the invention, followed by a more detailed description with reference to the drawings.

A storage server includes a memory having a uniform buffer cache soft-divided into a multi-level cache structure. As used herein, a uniform buffer caches refers to a buffer cache that is not hard divided into multiple portions or separate queues. Unless otherwise specified, a "buffer cache" will refer herein to a uniform buffer cache. A soft-divided cache provides multiple partitions of a cache that can be separately managed, but also have at least some common management and can exchange data as a single cache entity. As described herein, soft-dividing a cache includes logically partitioning a single memory unit into multiple parts, as opposed to providing multiple levels of separate memory units. In the soft-divided cache, the multiple levels provide different priority queuing for buffered data. Movement of data among different levels of a hard-divided buffer cache is traditionally not possible. In contrast, movement of data within the soft-divided cache described herein, and among the different levels of the cache is managed in accordance with rules. Rules can be provided for specific cache levels and/or for specific data. Data may also have an associated cache property that specifies how entry into the cache for the data is to be applied (i.e., which queue will be the entry point for new data). The buffer rules and cache property provide granular control over cache services of buffered data.

The multi-level buffer cache may also be referred to as a multi-queue or "waterfall" cache. As used herein, "buffer" generally refers to a reference (e.g., pointer) to a data block, but could alternatively refer to the data itself. Thus, a buffer cache temporarily stores references to active data blocks. The data blocks exist in volatile memory within the storage server, and the buffer cache of the storage server operates on references to the stored data blocks. For purposes of clarity, the description herein generally refers to "data blocks" when describing buffers. The principles discussed herein could also be applied the same, or slightly modified, to file-based caching rather than block-based caching (where a file is typically made up of multiple data blocks). As used herein, a queue refers to a sequence of buffers. As described herein, a buffer cache includes multiple queues, and each queue has an assigned priority level (as designed and implemented by a developer). Each queue has internal priority, for example, by moving data from a most-recently-used (MRU) position of the queue to a least-recently-used (LRU) position of the queue. Active data is data that is accessed more frequently, and is placed at higher levels of priority (i.e., within a queue and/or in a higher priority queue) within the cache than less active data.

In one embodiment, a data block includes a cache property. A cache property refers to metadata associated with a data block that indicates a reuse policy (e.g., aggressively reuse, default, reuse more slowly) to apply to the data block. The cache property can thus be thought of as a rule that indicates how aggressively to reuse the memory space occupied by a particular data block. Cache properties can be associated with or correspond to a data block by being assigned to the individual data block, because the data block is part of a file that has the cache property, because the data block is part of a volume or other logical grouping that has the cache property, etc. When a data block is added to the buffer cache, the cache management determines an initial level of entry for the data block. For example, in a cache having four levels of queuing, a data block may be indicated to enter the cache at the queue of second-highest priority queuing. The initial level can be determined via a direct indication (i.e., the data block specifies an initial level of priority), via inference from a data type (e.g., user data, system data, etc.), via inference from a priority level of the data (e.g., high priority data), etc. In one embodiment, a maximum level achievable within the cache by the data block can also be indicated. The maximum level could be indicated separately from the initial level, or indicated with the same information used to determine the initial level. As used herein, the expressions "maximum level," "minimum level," "entry level," and "priority level" generally refer to placement of a data block in a queue, rather than to movement of data with a queue, unless otherwise clear from context. Note that the maximum level and the initial level are not necessarily the same, although such an arrangement could be applied in particular implementations.

The data block can have a priority level assigned, which can be manipulated by a cache property associated with the data block. Thus, the initial and/or maximum level of the data block can be modified. For example, a data block could normally have an entry level of 5 (i.e., placed in a queue of priority level 5), and a cache property indicates for the data block to be entered at priority level 6. In one embodiment, a simple cache property implementation specifies one of three distinct options to apply to a data block. In the simplest implementation, a single policy applies to both the highest level of priority queuing within the multi-level cache that the data block achieve, as well as to the initial entry level of the data block. Nominally, these options may be referred to as a keep policy, a reuse policy, and a default policy. Other labels could be used to provide the same functionality. A keep policy directs the cache management to increase the initial and/or maximum level of the data block. The increase can be a single increment, or an increment by a number of levels. Similarly, a reuse policy indicates a decrease of the initial and/or maximum level of the data block. A default indication directs the cache management to apply whatever properties are assigned to the data block by default.

As mentioned above, each level of the multi-level buffer cache can be considered a different cache or a different queue. For convenience in discussion, the term "queue" will be used to refer to the different levels of the buffer cache. In one embodiment, each cache includes one or more rules that apply to data blocks buffered within the queues of the cache. The cache can apply buffer replacement on a schedule, and/or in response to events. For example, a cache can evaluate the data stored in the cache at periodic intervals. The cache may provide a count for each data block in the cache to determine how long the data block has been in a queue. The cache rules can specify an allowable amount of time for a particular queue before a data block is aged to a lower level queue. In general, a data block falls towards the least recently used (LRU) portion of the queue as it ages. Data blocks entering the cache enter at the most recently used (MRU) portion of the queue. A data block that exceeds a threshold may be removed from the LRU position (or LRU buffer) of the queue and placed into the MRU position (or MRU buffer) of a lower level queue.

One application of the use of MRU and LRU queuing is timestamp-based aging, which indicates that data blocks are to be moved to lower priority within a queue or out of one queue and into another queue of lower priority based upon a timestamp associated with the data block. The success of timestamp based aging of data blocks depends upon the selection of the expiration time. When the expiration time is too short, data blocks may be aged inappropriately. If the time is too long, it can cause cold buffers (data blocks) to stay in a queue too long. In one embodiment, an adaptive expiration time algorithm is implemented. Consider a queue with N buffers. In a steady state, it may be desirable to distribute the N buffers equally over the number of queue levels, L, in the cache. Thus, N/L data blocks would be in each queue. Assuming a rate of Q per second, where each operation accesses one buffer, then on average all buffers in the cache are accessed every N/Q seconds. Likewise, after N/LQ seconds, all the buffers on a single queue will have been accessed, assuming the buffers are hot. A hot buffer is very likely to have been accessed within the N/LQ seconds, and an LRU buffer on a queue can be regarded as cold if it has not been accessed within the same time period. The size of the queue, N, is known, as is the number of queues, L, in an implementation. The operation rate, Q, can be determined by counting the operations over an appropriate interval, for example, 2*expiration time. As one specific example, if N=700,000 buffers, L=6 levels (e.g., levels 0-7, with level 0 empty, and level 1 being transient), and Q=10,000 operations per second, the expiration time would be represented as 700,000/(6* 10,000)=12 seconds.

Just as a cache has rules that govern aging, the cache includes rules to indicate how data blocks are promoted. As used herein, promoting a data block or promotion of a data block refer to increasing a level of priority of the data block within the cache. In one embodiment, a buffer-touch approach is implemented. When a data block is accessed, a touch count for the data block is increased. A touch refers to an access of the data block. A touch of the data block may reset an aging timer associated with the data block, or a last-access timestamp. One or more touches may be required according to the rules to promote a data block from within one queue to the MRU position of a higher level queue. Rules can be different for different levels of queuing within the buffer cache. For example, in one embodiment, the rules of the lowest queue in the multi-level queue require only a single touch (i.e., access) to promote a data block to the next-higher queue. The next higher queue may instead require two touches to the data block to promote the data block to the next higher queue. Such an approach ensures that only "hot" buffers are moved up the priority. Hot buffers are buffers that are accessed frequently over a period of time relative to other buffers (and conversely, "cold" buffers are accessed infrequently as compared to others). Tiered rules in the different levels of the multi-level buffer cache also provide more granular control of data caching. The number of touches required to promote a data block varies from implementation to implementation, but could be one for lower level queues, and up to three for the higher level queues. Keeping track of only up to three touches also provides a practical implementation that only requires two bits per buffer to manage touches.

In addition to general aging and promoting of data blocks, rules can be applied specific to the type of the data block. Thus, system data can be treated separately from user data, for example. Data types can include, but are not limited to filesystem indirect blocks, system metadata (e.g., map files), user data, and priority data. To promote reuse or recycling of buffers that should be discarded while promoting the keeping of desired buffers, data types can be assigned default and maximum levels. The rules of one queue prevent promoting a data block to a higher queue when the data block is already in its maximum level. In such a case, rather than being promoted to a higher queue, the data block can simply be placed in the MRU position of the queue.

In addition to separate buffer rules, different data rules can also be applied within the buffer cache. Each queue can include a header that points to rules applying to specific data types. Data blocks may also be part of volumes or files that have specific rules associated with them. Thus, in addition to applying rules specific to a data type, the cache management can apply rules specific to a user designation (e.g., data blocks associated with a particular volume or other logical partition should be promoted faster, or aged faster, etc.).

In one embodiment, a network storage server provides a specific policy (which typically will be user-initiated) that triggers on a particular action on a buffer. For example, a buffer that has an associated "reuse" policy can be triggered for immediate recycling of the data block upon a read. Thus, on a read operation, the cache management performs a special action and places the data block in a state most likely to be reused (e.g., LRU of the lowest priority queue, high value on a timestamp). With such a mechanism, the cache management can allow for a read of data that is unlikely to be accessed again, and not have the data displace other data within the cache that may be more likely to be accessed again.

FIG. 1 is a block diagram of an embodiment of a storage server coupled to a storage subsystem, the storage server having a control-of-service controller and a buffer queuing manager. System 100 includes clients 102-104, which represent computing devices that access data on the storage system via read and/or write operations. Clients 102-104 are coupled to communication network 110. As used herein, coupling refers to any type of connectivity, whether electrical, mechanical, and/or communicative. Coupling of one device to another may occur through other hardware. Software components can be coupled to each other or to hardware through function calls, or other invocations of a routine/subroutine. Communication network 110 represents any type of network with associated hardware and software components. Network 110 can include one or more of a local area network (LAN), wide area network (WAN), metropolitan area network (MAN), global area network (GAN) such as the Internet, or any combination thereof. The connectivity hardware may include Category-5 or other twisted pair cable, coaxial cable, wireless communication transceivers, etc., as well as flow direction hardware (e.g., interface circuits/cards, switches, routers, servers). Each client 102 and 104 represents a computing device that accesses data stored in storage subsystem 130, and may be a conventional desktop computer, a laptop computer, workstation, a network server, mobile device such as a cellular telephone or PDA (personal digital assistant), etc. Storage server 120 is coupled to clients 102-104 via network 110, and services requested access operations generated by clients 102-104. The access may be dependent on the type of request made, the client permissions, etc.

Storage server 120 provides one example of a storage server, and includes COS (control of service) controller 122 and buffer queuing manager 124. COS controller 122 enables storage server 120 to provide different levels of service to different virtual partitions of storage. The different service levels can affect how storage server 120 performs caching functions on data. Buffer queuing manager 124 enables storage server 120 to apply selective caching control of buffers depending, at least in part, on a data type of the buffered data block, a level of service guaranteed by COS controller 122, user controls, etc. Note that COS controller 122 is complementary to the functioning of buffer queuing manager 124, but is not necessary for the operation of buffer queuing manager 124 in certain embodiments of the invention described herein.

Storage server 120 may provide clients with file-level services, as with traditional file servers; alternately, or in addition, storage server 120 may provide clients with block-level access to stored data. Storage server 120 can thus provide file-based (e.g., NAS (network attached storage)) services and/or block-based (e.g., SAN (storage area network)) services. The data services, whether file-level or block-level, include providing access to storage subsystem 130, for either data storage (write) and/or data retrieval (read).

Storage server 120 implements a filesystem (not shown in FIG. 1) to manage storage in disks of storage subsystem 130. As used herein, "disk" refers to any type of non-volatile storage device/means suitable for storing data. A disk may include any one or more of a conventional magnetic disk (e.g., hard disk), an optical disk (e.g., CD-ROM (compact disk-read only memory), DVD (digital video/versatile disc) based storage), magneto-optical (MO) storage, semiconductor-based storage (e.g., flash), etc. Because disks can and do fail, data storage across the disks is generally provided with the storage organized into one or more layers of abstraction. The abstraction layers also allow a logical disk organization managed by storage server 120, for example, a volume or aggregate, to store larger quantities of data than can fit on a single disk. Aggregates can include multiple volumes of stored data. As used herein, "volume" refers to a logical abstraction of physical storage, combining one or more disks or parts of disks into a single logical storage object. The volumes may in turn be further logically broken down into other abstraction layers (e.g., plexes, RAID groups). Conversely, a system can be thought of as having multiple RAID groups, and/or any similar or comparable logical grouping, further abstracted into other layers of storage for purposes of data storage management. Many types of RAID arrays or redundant disk arrays are known, some based on standards, and some proprietary. RAID groups may use storage from multiple, separate disks.

While specific terminology may be used herein, the operations as described herein with respect to RAID groups and volumes can be generically applied to any type of logical grouping. The filesystem operates in conjunction with a logical grouping abstraction controller (e.g., a RAID controller) that manages the physical interfacing of the storage server to the storage hardware.

In one embodiment, storage server 120 has a distributed architecture. With a distributed architecture, storage server 120 may include a separate N- ("network") module and a D- (disk) module (neither shown in FIG. 1). The N-module couples storage server 120 to communication network 110 to communicate with clients 102-104, and the D-module includes the file system/storage management functionality and couples storage server 120 to storage subsystem 130 to communicate with the disks. The N-module and D-module communicate with each other using an internal protocol. In an alternate embodiment, storage server 120 has an integrated architecture, with network and data components contained within a single box and/or single circuit component/manufacture. Storage server 120 may further be coupled through a switching fabric to other similar filers/file servers (not shown), each having its own local storage subsystem. In this way, one or more storage subsystems can form a single storage pool, to which a client of any of the file servers may be provided access.

Storage server 120 may be coupled locally to storage subsystem 130, which includes one or more disks 132-134. Disks 132-134 are examples of disks as described above. Storage server 120 includes one or more connectors and/or connection ports with which to couple to storage subsystem 130. The connectors and/or ports may be connection points for fiber optic cable, coaxial cable, twisted-pair communication lines, and/or secure wireless connections. The connection may support point-to-point or multi-drop connections. Storage server 120 manages storage subsystem 130, including receiving and processing read and/or write requests to data, maintaining data structures, organizing the physical resources of the disks into logical storage resources, etc. The data structure and logical storage resources are constructs for storage management to allow more storage in system 100, provide data access reliability, etc.

Buffer queuing manager 124 enables storage server to differentiate caching operations on different data blocks through the application of different rules. For example, rules can define how data block are aged within a buffer cache, how data blocks are to be promoted from one queue to another in the buffer cache, what level of initial priority, or minimum or maximum priority to assign to a data block (i.e., specify the queues in which a data block can be placed), etc. Other and/or additional rules could be used. Rules can be assigned to a buffer cache as a whole and optionally to different queues within the buffer cache. Rules can be distinguished for data types as indicated for the data block. Buffer queuing manager 124 provides a multi-level priority queuing buffer cache. Cold data blocks (or data blocks that are accessed less frequently than other data blocks over a period of time) "cascade" down from upper layers (or queues) of the cache into the lower layers of the cache until ultimate removal as the upper layers of the cache are filled with hot data blocks that are being accessed more regularly. Data blocks that are accessed are "promoted," or moved up the levels of the cache. As the data blocks are promoted or aged, they may be subject to different rules applicable at the different levels of the cache.

Figure 2:
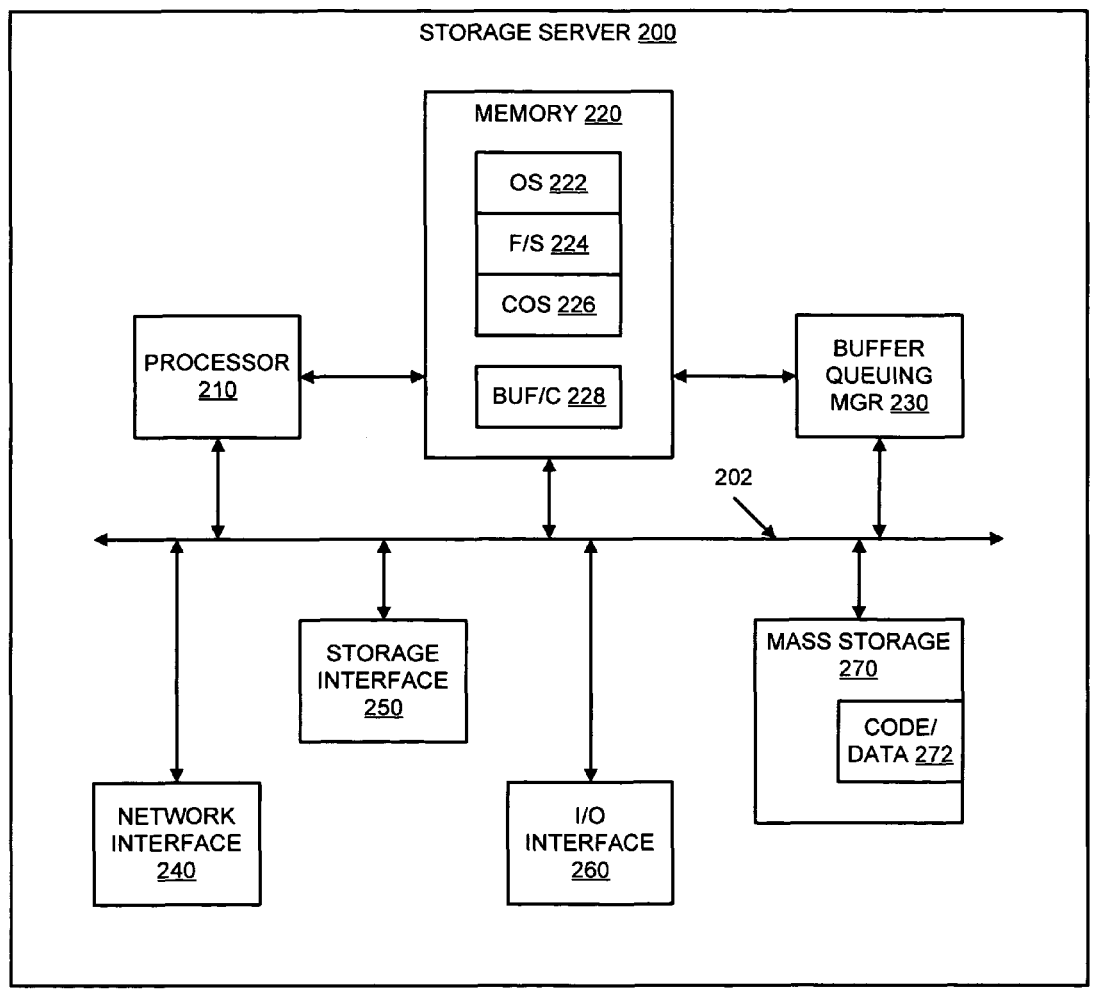
FIG. 2 is a block diagram of an embodiment of a storage server with a buffer queuing manager.

FIG. 2 is a block diagram of an embodiment of a storage server with a buffer queuing manager. Storage server 200 provides an example of a storage server, and may be one example of storage server 120 of FIG. 1. Storage server 200 includes one or more processors 210, and memory 220 coupled to processor 210. Processor 210 may include any type of microprocessor, central processing unit (CPU), processing core, etc., to enable performing operations related to storage management and servicing data access requests. Processor 210 controls the overall operation of storage server 200, and may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 220 represents the main memory of storage server 200 to provide temporary storage for code or data to be executed by processor 210. Memory 220 may include read-only memory (ROM), flash memory, one or more varieties of random access memory (RAM, e.g., static RAM (SRAM), dynamic RAM (DRAM), synchronous DRAM (SDRAM), etc.), or a combination of memory technologies. Memory 220 stores, among other things, operating system (OS) 222 that provides one or more functions of storage server 200, filesystem (F/S) 224 that controls the accessing of data, and COS layer 226 that can enable storage server 200 to treat data differently depending on rule applicable to specific data.

In one embodiment, storage server 200 includes buffer queuing manager 230. Buffer queuing manager 230 may include hardware and/or software components. In one embodiment, buffer queuing manager 230 is included within OS 222. Buffer queuing manager 230 is described in more detail below, and in general, provides controls of a multi-level buffer cache (buf/c) 228 implemented within memory 220. Buffer queuing manager 230 could be provided as a programmable circuit component coupled to bus system 202, as part of OS 222, as an application or program kernel or linked executable running on OS 222, or some combination of these.

Processor 210 and memory 220 are coupled to bus system 202. Bus system 202 is an abstraction that represents any one or more separate physical buses, communication lines/interfaces, and/or multi-drop or point-to-point connections, connected by appropriate bridges, adapters, and/or controllers. Therefore, bus system 202 may include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394-1995 bus, published Aug. 30, 1996, commonly referred to as "Firewire."

Also coupled to processor 210 through bus system 202 are one or more network interface(s) 240, one or more storage interface(s)/adapter(s) 250, one or more input/output (I/O) interface(s) 260, and one or more internal mass storage device(s) 270. Network interface 240 enables storage server 200 to communicate with remote devices (e.g., clients) over a network and may be, for example, an Ethernet adapter. Storage interface 250 enables storage server 200 to access a storage subsystem and may be, for example, a Fibre Channel adapter, a SCSI adapter, a network adapter, etc. Storage server 200 may typically be accessible to electronic or computer "users" rather than human users. Thus, I/O interface 260 may include one or more interface components to connect storage server 200 with other electronic equipment, for example, custom connections, blade adapters, etc. Additionally, storage server 200 could be made to be accessible to a human user, and thus have video, audio, and/or alphanumeric interface through I/O interface 260. Internal mass storage 270 may be or include any conventional medium for storing large volumes of data in a non-volatile manner. Mass storage 270 holds data and/or instructions in a persistent state (i.e., the value is retained despite interruption of power to storage server 200). Mass storage 270 includes code and/or data 272 that may be accessed and placed in memory 220 for execution by processor 210.

Various descriptions above and in other places herein make reference to managers or modules, which may include components of hardware, software, and/or a combination of these. In a case where a component to perform the functions described herein includes software, the software data, instructions, and/or configuration may be provided via an article of manufacture by a machine/electronic device/hardware. An article of manufacture may include a machine readable medium having content to provide instructions, data, etc. The content causes or results in a machine performing various operations or executions described herein. A machine readable medium includes any mechanism that provides (i.e., stores and/or transmits) information/content in a form accessible by a machine (e.g., computing device, electronic device, electronic system/subsystem, etc.). For example, a machine readable medium includes recordable/non-recordable media (e.g., read only memory (ROM), random access memory (RAM), magnetic disk storage media, optical storage media, flash memory devices, etc.). The machine readable medium may further include an electronic device having code loaded on a storage that may be executed when the electronic device is in operation. Thus, delivering an electronic device with such code may be understood as providing the article of manufacture with such content described herein. Furthermore, storing code on a database or other memory location and offering the code for download over a communication medium may be understood as providing the article of manufacture with such content described herein.

Figure 3:
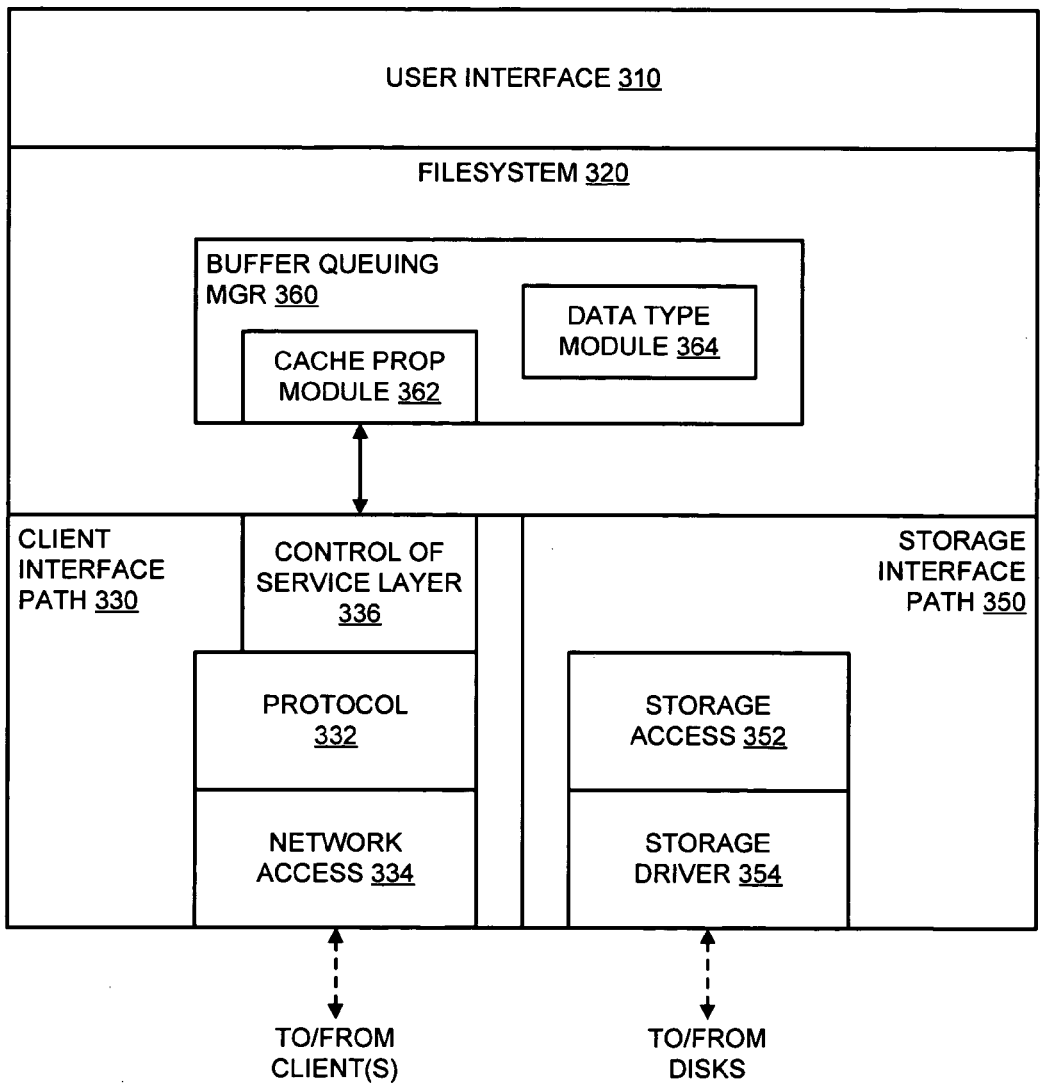
FIG. 3 is a block diagram of an embodiment of an operating system of a storage server having a control of service layer and a buffer queuing manager.

FIG. 3 is a block diagram of an embodiment of an operating system of a storage server having a control of service layer and a buffer queuing manager. Operating system 300 is one example of an operating system such as OS 222 of FIG. 2. As shown, operating system 300 includes several modules or functional components, which may also be referred to as "layers." One layer includes user interface 310, to provide access to a user, for example, a human storage network administrator, a management system, a diagnostic server, etc. Filesystem 320 is located logically below user interface 310. Filesystem 320 is a software kernel managed by the operating system that tracks/maintains a directory structure (hierarchy) of data stored in an associated storage subsystem, and manages read/write operations on the data (i.e., executes read/write operations on the disks in response to requests). In one embodiment, filesystem 320 includes buffer queuing manager 360, which further includes cache property (prop) module 362 and data type module 364.

Client interface path 330 is depicted with protocol layer 332 and network access layer 334 associated with protocol layer 332, to allow filesystem 320 access over a network with clients, and particularly to client applications. Client interface path 330 may be understood to include more components than what are depicted in FIG. 3. Protocol layer 332 implements one or more of various higher-level network protocols, such as Network File System (NFS), Common Internet File System (CIFS), Hypertext Transfer Protocol (HTTP) and/or Transmission Control Protocol/Internet Protocol (TCP/IP), Fibre Channel Protocol (FCP), and/or iSCSI Protocol (SCSI over TCP/IP). Many protocols can be supported, with different protocols applicable to separate connections with different clients. The protocol to use in any particular connection may be established prior to operation of the system, or negotiated at run time. Network access layer 334 includes one or more drivers or other medium-interface software routines/programs that implements a lower-level protocol to implement the protocol of protocol layer 332 in a physical interface to communicate over the network, such as Ethernet.

In one embodiment, client interface path 330 includes control of service layer 336, which allows varied management of data based on the workload (data type, data source, etc.). Control of service layer 336 can assign and determine priority levels of different data blocks. In an embodiment where control of service is implemented, buffer queuing manager 360 caches and manages data blocks based at least in part on the priority level established for the data blocks. Specifically, buffer queuing manager 360 includes cache property module 362 that interacts with control of service layer 336, to obtain and/or set priority levels of data blocks according to a cache property of the data block, and a priority level of the data block. As discussed above, data blocks may have a priority level assigned based on the data type of the data block, a file to which the data block belongs, a source of the data block (e.g., from a particular program or user), etc. The priority level that the data block can achieve in the buffer cache can be bounded by upper and/or lower bounds. The priority of the data block is changed based at least in part on access to the data block (i.e., requests to read or write the data block).

Data type module 364 of buffer queuing manager 360 can be the same or a different component than cache property module 362. Data type module 364 determines the data type of a particular data block and the rules associated with the data block. Data specific rules can also be accessed that may be related to a file or partition to which the data block belongs. Thus, rules can be specified for, and applied to particular data blocks.

Storage interface path 350 includes storage access layer 352 and storage subsystem driver layer 354. Storage interface path 350 is also to be understood as merely representative, and may include more components and/or layers than what are depicted. Storage access layer 352 implements a disk storage protocol, such as RAID, and storage subsystem driver layer 354 implement a lower-level disk access protocol, such as Fibre Channel Protocol (FCP), SCSI, advanced technology attachment (ATA), serial ATA (SATA), serial attached storage (SAS), etc., which may implement commands/requests made by the higher level protocol. To facilitate the description of the following details herein, it will be assumed that storage access layer 352 implements RAID, such as RAID-4, RAID-DP (created by Network Appliance Inc.), etc., and therefore may alternatively be referred to as RAID layer 352.

Figure 4:
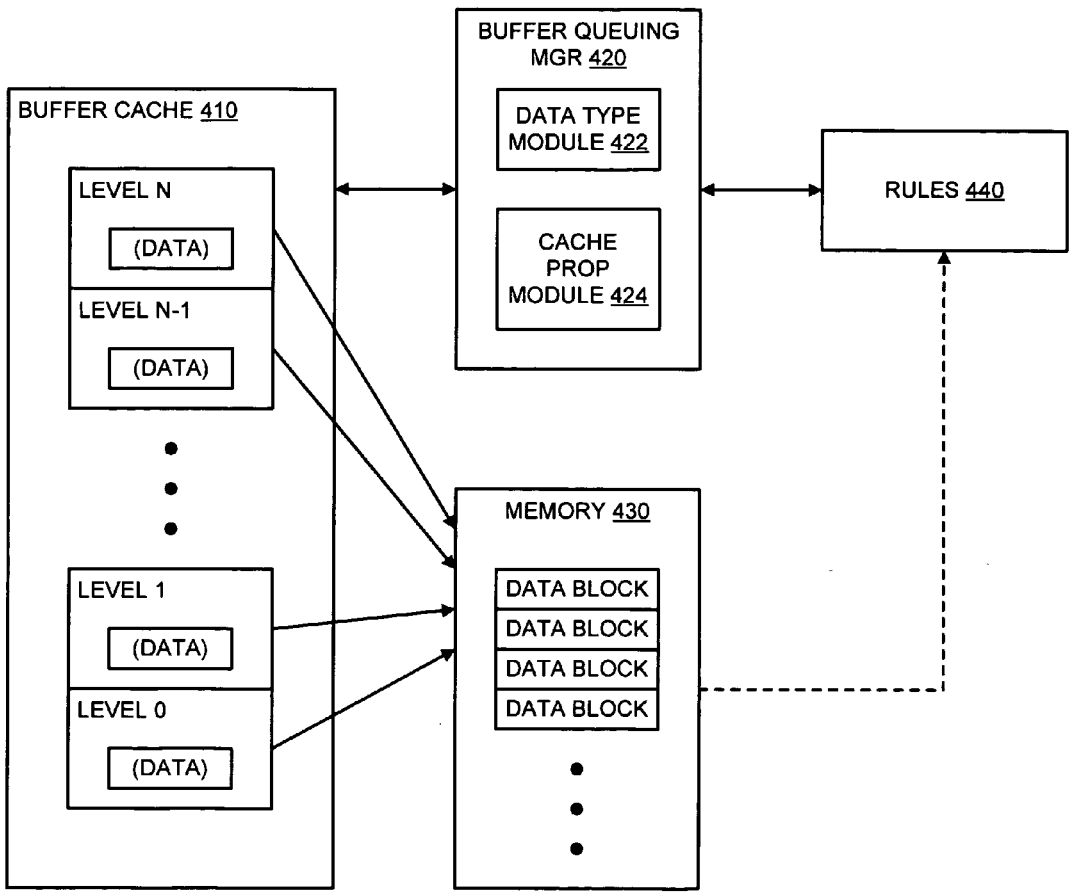
FIG. 4 is a block diagram of an embodiment of a system having a multi-level buffer cache managed by a buffer queuing manager in accordance with cache rules.

FIG. 4 is a block diagram of an embodiment of a system having a multi-level buffer cache managed by a buffer queuing manager in accordance with cache rules. System 400 includes multi-level buffer cache 410, which provides multiple levels of priority queuing. Buffer cache 410 is an example of a buffer cache according to any embodiment described herein. The number of levels is dependent on the implementation, and factors such as the number of different data types and the level of granularity desired in the control of the caching. Buffer cache 410 includes level 0 through level N, where N is an integer of 1 or greater. Each level includes data pointers, represented in FIG. 4 as (data). Each level of buffer cache 410 could be considered a separate cache or a separate queue. In one embodiment, each level of buffer cache 410 has rules associated with it, which can be stored in rules database or rules table 440. The type of structure or storage used for the rules is not relevant to operation of the invention. In one embodiment, rules 410 includes a separate rule structure for each level of buffer cache 410. Rules 440 are accessed and applied to data blocks in buffer cache 410 by a management entity.

Buffer queuing manager 420 represents the management entity that access and applies rules to the data, and represents an example of a buffer queuing manager according to any embodiment described herein. Buffer queuing manager 420 includes data type module 422, which represents a module that determines the type of data and determines rules associated with the data type determined. Buffer queuing manager 420 also includes cache property module 424 that determines a cache property associated with a data block and applies the property to the placement and/or movement of the data block within buffer cache 410. Data type module 422 and cache property module 424 can operate independently of one another. In one embodiment, both modules are included, providing the functionality to adjust a priority of a data block based on a cache property, as well as being able to apply specific rules based on the type of the data block. In alternate embodiments, one or the other of the modules is present to include the functionality of one and not the other.

The data pointers in buffer cache 410 points to a data block located in memory 430, which represents a volatile memory accessible to the storage server of system 400. The management and organization of the data blocks in buffer cache 410 does not necessarily affect the ordering of data blocks within memory 430. The data blocks have an association represented by the dashed line with one or more rules 440.

Figure 5:
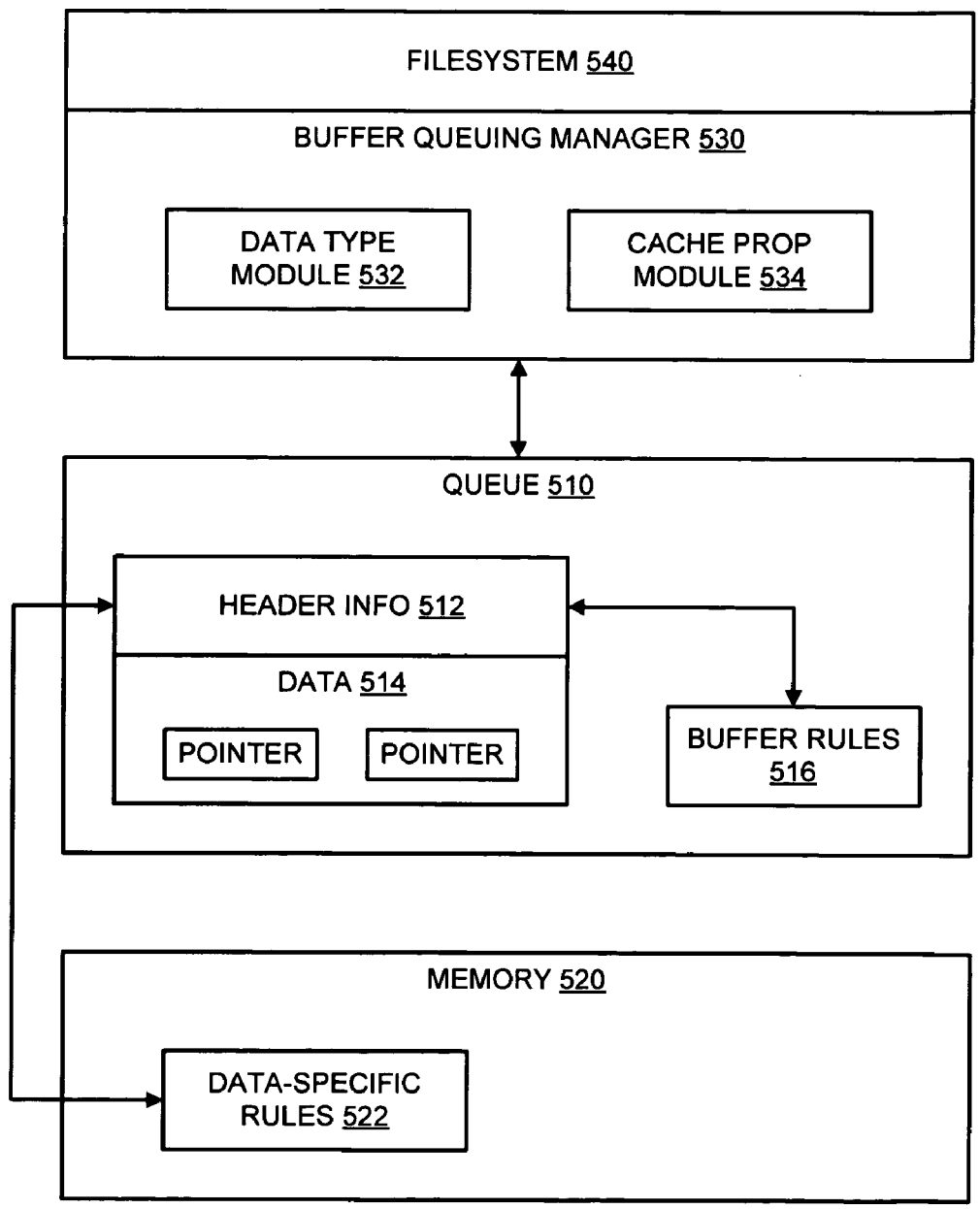
FIG. 5 is a block diagram of an embodiment of a buffer cache having buffer rules and a header that points to data-specific rules.

FIG. 5 is a block diagram of an embodiment of a buffer cache having buffer rules and a header that points to data-specific rules. Queue 510 represents a priority queuing level of any embodiment of a buffer cache described herein. Queue 510 includes data 514, which includes pointers to data blocks. Queue 510 also includes header information (info) 512, which represents a structure accessible to buffer cache management (e.g., by buffer queuing manager 530) to indicate a data type of each item of data 514. Header information 512 can indicate buffer rules 516 to the buffer management. Buffer rules 516 can include rules for specific data types, and rules specific to the queue (e.g., how many touches are required to move a data block to a higher level queue).

Header information 512 also points to data-specific rules 522 stored in memory 520. Data-specific rules 522 include rules that apply to a data block as a result of an association of the data block with a file or partition having specific user-defined rules. Buffer management accesses header information 512, which then directs the management to the rules related to a particular data block. Header information 512 includes specific information for each data block cached.

Buffer queuing manager 530 can include data type module 532 and/or cache property module 534 that accesses header information 512 to apply rules to the data blocks. Data type module 532 enables buffer queuing manager 530 to determine a data type of the specific buffers of queue 510, which indicates how to apply buffer replacement. Cache property module 534 enables buffer queuing manager 530 to determine whether to adjust the default entry and promotion levels of a data block to more aggressively reuse or keep the data block. Filesystem 540 may exist as a layer above buffer queuing manager 530. Filesystem 540 and buffer queuing manager 530 may operate independently of each other.

Figure 6:
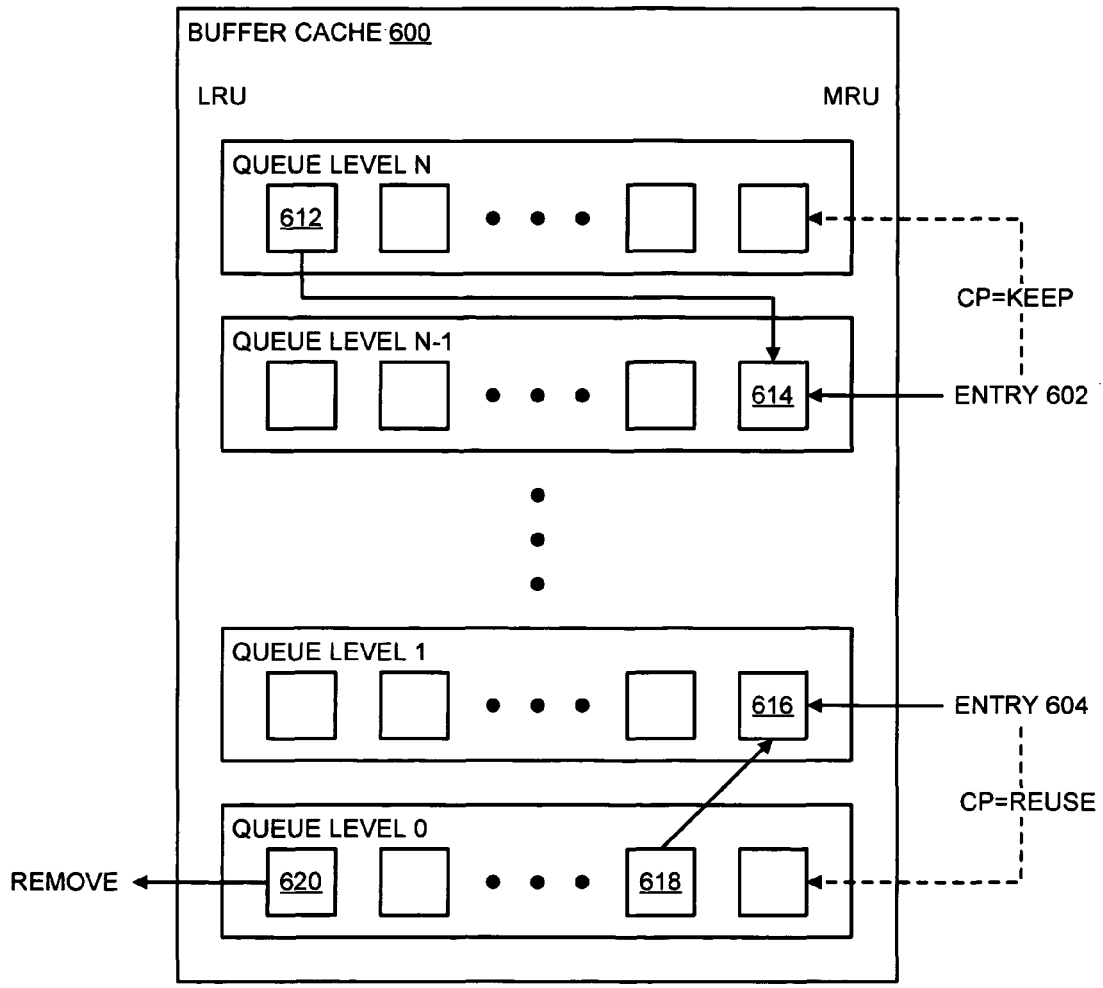
FIG. 6 is a block diagram of an embodiment of a multi-level buffer cache that manages data entry and data movement within the cache in accordance with buffer rules and cache policies.

FIG. 6 is a block diagram of an embodiment of a multi-level buffer cache that manages data entry and data movement within the cache in accordance with buffer rules and cache policies. Buffer cache 600 represents a buffer cache according to any embodiment described herein. Buffer cache 600 includes queue levels 0 through N, where N is an integer greater than zero. Each level of buffer cache 600 can be considered a separate queue. The queues are shown with an MRU and LRU, with other buffers between the MRU and LRU.

Queue N is shown with LRU buffer 612. If LRU buffer 612 has aged sufficiently (i.e., there has been no access to the data block of buffer 612 during a period of time in which other buffers of queue N are accessed), it may be selected to be moved to the next-lower queue, queue N−1. The data block will be moved from LRU buffer 612 of queue N to MRU buffer 614 of queue N−1.

MRU 614 of queue N−1 may also receive a data block by entry 602, when a new data block is placed into buffer cache 600. Entry 602 represents the placing of a data block into buffer cache 600 that has a priority level corresponding to the level of queue N−1. In one embodiment, the data block represented by entry 602 includes a cache policy (CP). If the cache policy indicates a "keep" policy, instead of placing entry 602 in MRU 614 of queue N−1, entry 602 is placed in the MRU of queue N. Similarly, another data block may be entered into buffer cache 600, and have a data type that defaults its entries to queue 1. Entry 604 would thus place the data block in MRU 616 of queue 1. If the data block included a cache policy that indicated more aggressive reuse of the buffer, the entry-level queue may be downgraded to queue 0, and the data block of entry 604 is placed in the MRU of queue 0 instead of MRU 616 of queue 1.

In queue 0, buffer 618 is shown as being moved from queue 0 to MRU 616 of queue 1. When buffer 618 meets the rules for movement to a higher queue (e.g., receiving a threshold number of accesses or touches), the data block is moved up to the higher queue. When a buffer in queue 0 has aged beyond a threshold (buffer 620), it may be removed from buffer cache 600. The removal of a buffer from buffer cache 600 is generally performed in conjunction with an addition of a buffer into buffer cache 600. When the rates of aging and buffer addition do not match, the performance of the buffer cache diminishes as the cache fills up. The proper aging and keeping of important data through the techniques described herein maintains better buffer cache performance.

In one embodiment, the data of buffer 620 is data that is subject to a special cache management policy. In addition to a cache policy property, a data block may have an associated indicator that indicates the data block is subject to a special operation. For example, if the data of buffer 620 has a "reuse" policy, and a special indicator is set to true, the cache management places the data directly at buffer 620 after a read or write access. Placing the data block at buffer 620 directly after access is in contrast to placing the data block in the entry position that would normally be used for the data block.

Figure 7:
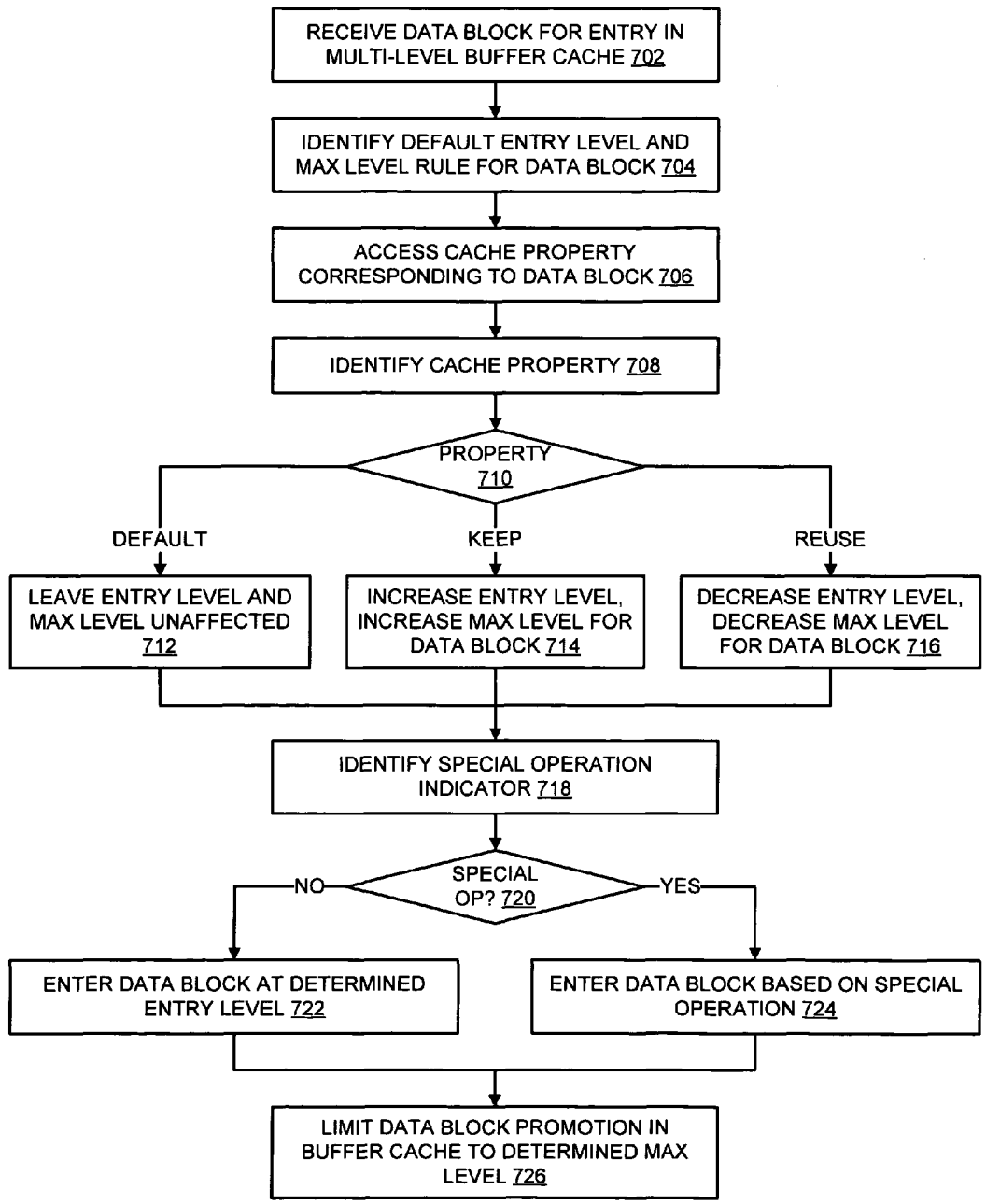
FIG. 7 is a flow diagram of an embodiment of a process for placing data in a buffer cache according to a cache property.

FIG. 7 is a flow diagram of an embodiment of a process for placing data in a buffer cache according to a cache property. Cache management receives a data block for entry in a multi-level buffer cache, 702. The cache management identifies a default entry level rule for the data block, 704. The entry level rule can be a simple indication of a level of priority at which the data block should initially be placed. The same or a different rule may be applied for a maximum level the data block can achieve within the buffer cache, 704. Thus, a data block may be placed in a queue of a particular level of priority queuing, and could be aged down to a lower queue and could be promoted to a higher queue. The aging and promotion can depend on the type of data block involved, as well as access to the data block. The data block also includes a corresponding cache property, which the cache management accesses, 706. The cache property is identified by the cache management and compare against the default level indicated for the data block, 708.

In one embodiment, the cache property is identified as a default, keep, or reuse policy, 710. Based in part on the cache property, the cache management determines an entry level for a data block, whether a default level or another level. With a default policy, cache management leaves the entry level and maximum level are left unaffected, 712. While the process is described in reference to affecting both the entry and maximum levels, it will be understood that separate cache properties could be used to affect each feature separately. With a keep policy, cache management increases the entry level and the maximum level for the data block, 714. In one embodiment, the cache property is stored in the memory allocated for the buffer cache. Other memory could be used to store the cache property. In one embodiment, the applicable cache entry level and maximum level are different from the defaults, and stored separately in memory by the cache management. Alternatively, changing the levels applied to a data block includes changing the level stored in memory for the data block. With a reuse policy, cache management decreases the entry level and maximum level for the data block, 716.

After application of the cache property, cache management can optionally identify a special operation indicator, 718. In one embodiment, special operation indicators are not used in a system, and operations representing blocks 720-724 can be omitted. In another embodiment, the special operation indicators are used, and the cache management determines whether a special operation indicator is present and identifies the indicator. A special operation indicator refers to an indication of an operation or function to perform in response to a condition. For example, the special operation may indicate an "immediate reuse" of the data, a specific cache level at which to enter the data, etc. Rather than operating on a data block under default rules, the special operation indicator allows cache management to treat certain data differently than other data. If there is no special operation indicated, 720, the cache management enters the data block at the entry level determined above by the cache management, 722. If there is a special operation indicated, 720, the cache management enters the data block in the cache based on the special operation, 724. During functioning of the buffer cache, the cache management limits promotion of the data block in the buffer cache from going above the determined maximum level, 726.

A flow diagram as illustrated herein provides an example of a sequence of various operations. Although shown in a particular sequence or order, unless otherwise specified, the order of the operations can be modified. Thus, the illustrated implementations should be understood only as examples, and operations can be performed in a different order, and some operations may be performed in parallel.

Figure 8:
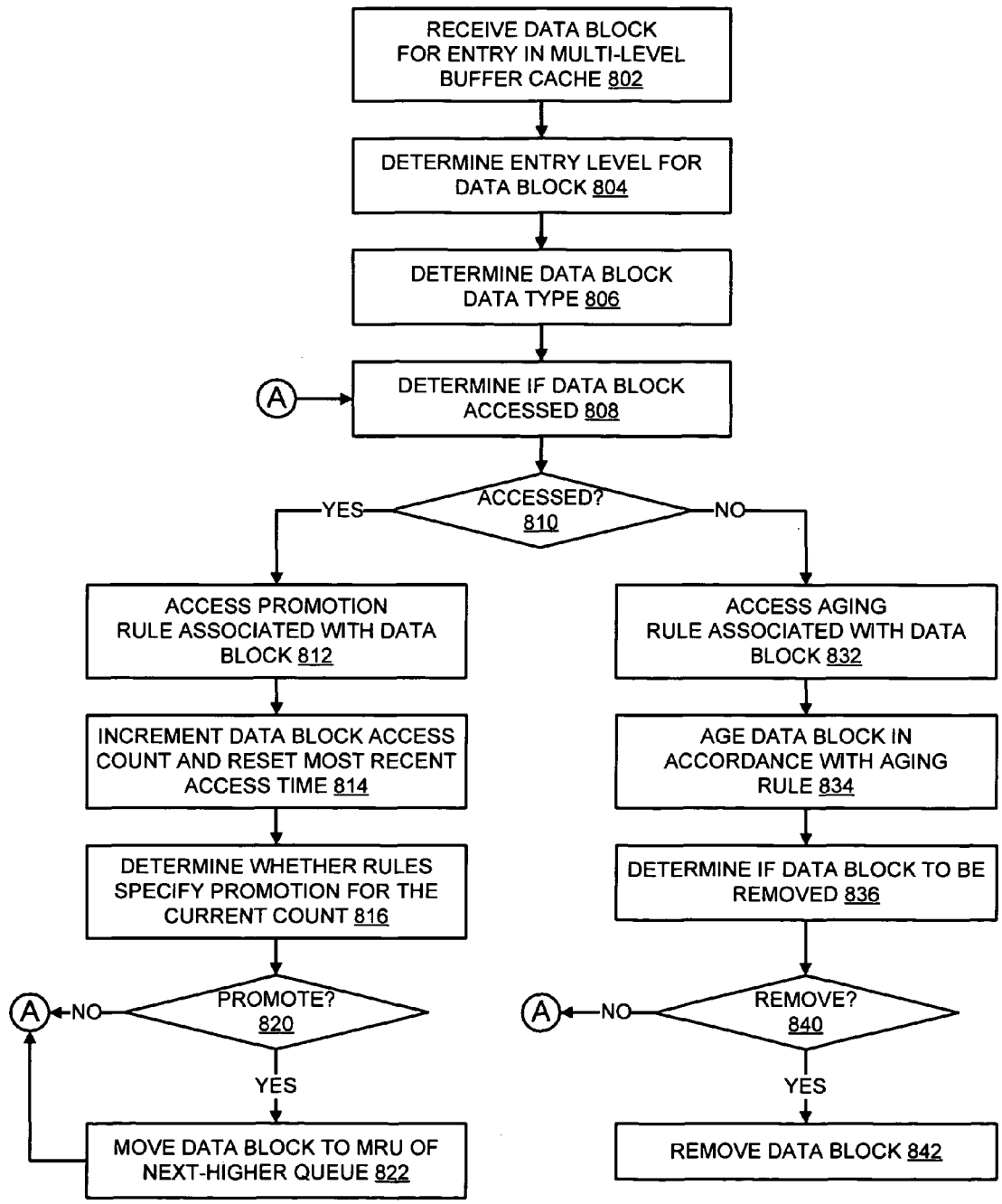
FIG. 8 is a flow diagram of an embodiment of a process for promoting and aging data within a buffer cache.

FIG. 8 is a flow diagram of an embodiment of a process for promoting and aging data within a buffer cache. The cache management receives a data block for entry in the multi-level buffer cache, 802. The cache management determines an entry level for the data block, 804, an example of which is described with reference to FIG. 7. The cache management determines the data block data type, 806. The data type can indicate how rules should be applied to the data block and/or which rules should apply to the data block.

The cache management continually monitors the data block to determine if the data block is accessed, 808. Access to the data block is the primary mechanism in an LRU cache to determine whether to retain a data block. If the data block is accessed, 810, the cache management accesses a promotion rule associated with the data block, 812. The promotion rule is a rule that specifies what to do when a data block is accessed. More particularly, the promotion rule indicates how the cache management is to determine when and how to increase the priority level of a data block within the buffer cache. The promotion rule is one of the rules stored by the cache management in a database of cache rules. For example, the rules can indicate keeping a count for the number of times a data block is accessed. When a threshold is reached, for example, the data block may be promoted to be the MRU buffer position of the same queue in which the data block is currently cached, or in a higher queue. The data block access count is incremented based on access to the data block, and a most recent access time indication is reset, 814. The cache management determines whether the rules for the data block indicate promotion for the current access count (e.g., comparing the current count of the data block to a threshold stored in the rules), 816. The rules applied can be specific to the queue (e.g., how many accesses to move out of the queue), or the data block (e.g., the data block may have a certain number of accesses required to be promoted—i.e., a slow increasing data type). If the data block is to be promoted, 820, the data block is moved to the MRU of the next-higher queue, 822. If the data block has not reached a threshold number of touches, and/or the data block is already at its maximum queue level, the data block is not promoted, 820, and the cache management continues to monitor access to the data block, 808.

If the data block is not accessed, the data block continues to age, 810. The data block may have an associated aging rule that is accessed by the cache management, 832. The cache management ages the data block in accordance with the aging rule, 834. The aging typically is applied the same for all buffers. However, aging could be applied differently to specific data types and specific queues in more complex implementations of a buffer cache as described herein. Aging may not require any action, and instead simply rely on the queue tracking the least recently used buffer. The cache management determines if the data block is to be removed from the queue, 836. Removal from the queue may be specified for data blocks with a timestamp older than a threshold.

If the rules indicate that the data block should be removed from the queue, 840, the data block is removed, 842, and may be placed in a lower queue, or removed from the buffer cache entirely. If the data block is not to be removed, 840, the cache management continues to monitor the data block for access, 808.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for managing a uniform buffer cache, comprising:
providing multiple buffer queues in the uniform buffer cache, each buffer queue having a corresponding level of queuing priority in the buffer cache, wherein data blocks are movable among the multiple queues, wherein each data block stores data having a specific data type;
promoting a buffered data block to a level of higher queuing priority based on a combination of:
a number of accesses to the data block and
the specific data type stored in the data block, including promoting a data block storing user data in a different way than a data block storing system data;
the promoting including increasing an access count of the data block up to a threshold, based on access to the data block, prior to promoting the buffered data block, wherein the threshold comprises a value representing a plurality of data accesses, and wherein a threshold for data blocks storing user data is different from a threshold for data blocks storing system data; and
aging a buffered data block based at least in part on a combination of a number of accesses to the data block and the specific data type stored in the data block, including aging a data block storing user data in a different way than a data block storing system data, wherein an amount of the increase in the access count is different for different levels of queuing priority of the data block, where different queuing priority levels are promoted or aged at different rates.

2. The method of claim 1, wherein promoting the buffered data block comprises:
preventing the data block from being promoted to a level of queuing priority higher than a maximum level of queuing priority specified for the data block.

3. The method of claim 1, wherein promoting the buffered data block further comprises:
accessing rules associated with the level of queuing priority in which the data block is buffered; and
promoting the data block in accordance with rules specific to the level of queuing priority, where different levels of queuing priority have different rules.

4. The method of claim 1, wherein promoting the buffered data block further comprises:
accessing rules associated with a logical partition of which the data block is a part; and
promoting the data block in accordance with rules specific to the logical partition, where different logical partitions have different rules.

5. The method of claim 1, wherein aging the buffered data block comprises:
marking the data block with a last-access timestamp; and
moving the data block to a level of lower priority queuing if the timestamp reaches a threshold expiration time.

6. The method of claim 1, wherein the data blocks movable among the multiple queues comprise pointers to locations in memory where data blocks are stored.

7. A method for managing a uniform buffer cache, comprising:
providing multiple buffer queues in the uniform buffer cache, each buffer queue having a corresponding level of queuing priority in the buffer cache, wherein data blocks are movable among the multiple queues, and wherein each data block stores data having a specific data type;
identifying a default entry level queuing priority within the buffer cache associated with a data block to be entered into the buffer cache based on a system configuration;
identifying a cache policy property associated with the data block, where the cache policy property is based on a combination of a number of accesses to the data block if the number of accesses reaches a threshold number, wherein the threshold number comprises a value representing a plurality of data accesses, and wherein a threshold for data blocks storing user data is different from a threshold for data block storing system data, and a rule for the specific data type stored in the data block, where the cache policy property for a data block storing user data is different than the cache policy property for a data block storing system data, wherein the identifying includes identifying the specific data type stored in the data block, and identifying an entry level queuing priority for the specific data type, wherein the specific data type stored in the data block is associated with a different entry level queuing priority than an entry level queuing priority of a different data type;
modifying an entry level queuing priority of the data block from the default entry level based on the cache policy property;
promoting a buffered data block to a level of higher queuing priority based on a combination of:
the number of accesses to the data block, and
the specific data type stored in the data block, including promoting a data block storing user data in a different way than a data block storing system data;
the promoting including increasing the number of accesses to the data block up to a threshold, based on access to the data block, prior to promoting the buffered data block, wherein an amount of the increase in the number of accesses is different for different levels of queuing priority of the data block, where different queuing priority levels are promoted at different rates.

8. The method of claim 7, wherein identifying the cache policy property associated with the data block comprises:
identifying the cache policy property as one policy selected from a default policy that applies if no other policy applies, a keep policy that indicates increasing the entry level queuing priority relative to the default policy to promote keeping the data block in the cache longer, and a reuse policy that indicates decreasing the entry level queuing priority relative to the default policy to promote removing the data block from the cache quicker.

9. The method of claim 8, wherein increasing the entry level queuing priority for the keep policy comprises:
incrementing the entry level queuing priority by one level; and
wherein decreasing the entry level queuing priority for the reuse policy comprises:
decrementing the entry level queuing priority by one level.

10. The method of claim 7, wherein identifying the cache policy property associated with the data block comprises:
identifying a special indicator for the data block that indicates the data block is to be scheduled at a specific level of queuing priority.

11. The method of claim 10, wherein identifying the special indicator for the data block that indicates the data block is to be scheduled at the specific level of queuing priority comprises:
identifying a special indicator that indicates the data block is to be scheduled at a least-recently used buffer of a lowest level of queuing priority.

12. The method of claim 7, further comprising:
  identifying a maximum level of queuing priority attainable by the data block; and
  modifying the maximum level of queuing priority of the data block based at least in part on the cache property.

13. The method of claim 7, wherein providing the multiple queues in the uniform buffer cache comprises:
  maintaining a queue header for each queue, the queue header to point to rules specific to the queue and to rules specific to a data block referenced in the header.

14. A storage server comprising:
  a memory device having a uniform buffer cache soft-divided into multiple queues with a data block stored in one of the queues, the queues having different levels of queuing priority; and
  a buffer cache manager to manage the buffer cache, the buffer cache manager having a data type module to:
    identify a specific data type stored in the data block,
    identify a rule associated with moving the data block of the specific identified data type to a queue of a different level of priority,
    count a number of accesses to the data block, and
    move the data block to the queue of the different level of queuing priority based on a combination of:
      increasing the number of accesses of the data block up to a threshold, based on access to the data block, prior to said move of the buffered data block, wherein an amount of the increase in the number of accesses is different for different levels of queuing priority of the data block,
      the number of accesses to the data block, if the number of accesses reaches a threshold number indicated in the rule associated with the data block, wherein the threshold number comprises a value representing a plurality of data accesses,
      the specific identified data type stored in the data block, and the identified rule associated with the data block;
    wherein a data block storing user data is moved in a different way than a data block storing system data, and wherein a threshold for data blocks storing user data is different from a threshold for data blocks storing system data.

15. The storage server of claim 14, the buffer cache manager further having a cache property module to identify a cache property corresponding to the data block and modify a default level queue of the data block for initial placement of the data block into the buffer cache.

16. The storage server of claim 14, the buffer cache manager further having a cache property module to identify a cache property corresponding to the data block and modify a maximum level queue to which the data block can be moved.

17. The storage server of claim 14, wherein the rule is associated with the data block as a specific rule for the priority level of the queue in which the data block is stored.

18. The storage server of claim 14, wherein the rule is associated with the data block as a specific rule for the specific data type stored in the data block.

19. The storage server of claim 14, wherein the rule is associated with the data block as a specific rule for a logical partition of which the data block is a part.

* * * * *